(12) United States Patent
Brinker et al.

(10) Patent No.: US 7,469,498 B2
(45) Date of Patent: Dec. 30, 2008

(54) FISHING LINE RELEASE SYSTEM

(76) Inventors: Kevin John Brinker, 9424 Dixie Hwy., Clarkston, MI (US) 48348; Holly Jean Moore, 9424 Dixie Hwy., Clarkston, MI (US) 48348

( * ) Notice: Subject to any disclaimer, the term of this patent is extended or adjusted under 35 U.S.C. 154(b) by 0 days.

(21) Appl. No.: 11/301,180

(22) Filed: Dec. 12, 2005

(65) Prior Publication Data

US 2006/0179707 A1      Aug. 17, 2006

Related U.S. Application Data

(63) Continuation-in-part of application No. 10/790,998, filed on Mar. 2, 2004, now abandoned, which is a continuation-in-part of application No. 10/439,380, filed on May 19, 2003, now abandoned.

(51) Int. Cl.
*A01K 91/08* (2006.01)
(52) U.S. Cl. ..................................... 43/43.12
(58) Field of Classification Search ................ 43/43.12, 43/43.13
See application file for complete search history.

(56) References Cited

U.S. PATENT DOCUMENTS

| | | | | |
|---|---|---|---|---|
| 2,830,400 A | * | 4/1958 | Perry | .......................... 43/43.12 |
| 4,069,611 A | * | 1/1978 | Dusich et al. | ............... 43/43.12 |
| 4,173,091 A | * | 11/1979 | Emory, Jr. | ................... 43/43.12 |
| 4,212,127 A | * | 7/1980 | Daniels | ..................... 43/43.12 |
| 4,428,142 A | * | 1/1984 | Shedd et al. | ................ 43/43.12 |
| 4,856,222 A | * | 8/1989 | Hannam | ..................... 43/26.1 |
| 5,107,616 A | * | 4/1992 | Ryder | ........................ 43/43.12 |
| 2005/0102885 A1 | * | 5/2005 | Albrant, Jr. | ................ 43/43.12 |

* cited by examiner

*Primary Examiner*—Kurt Rowan
(74) *Attorney, Agent, or Firm*—Butzel Long

(57) ABSTRACT

A fishing line release system is disclosed. The fishing line release system includes a fishing line quick release mechanism that may be used in conjunction with a planar device for trolling or may alternatively be used with a down rigger cable and weight when used in down rigger fishing. When used in conjunction with the planar device, the system may be used for directional trolling. The planar device comprises a planar body, the fishing line quick release mechanism attached to the planar body, and a line locking assembly for securing a portion of a fishing line to the planar body. When used in conjunction with a down rigger cable and weight, the quick release mechanism may be used either on the down rigger cable or may be attached to the down rigger weight.

9 Claims, 11 Drawing Sheets

Fig. 14
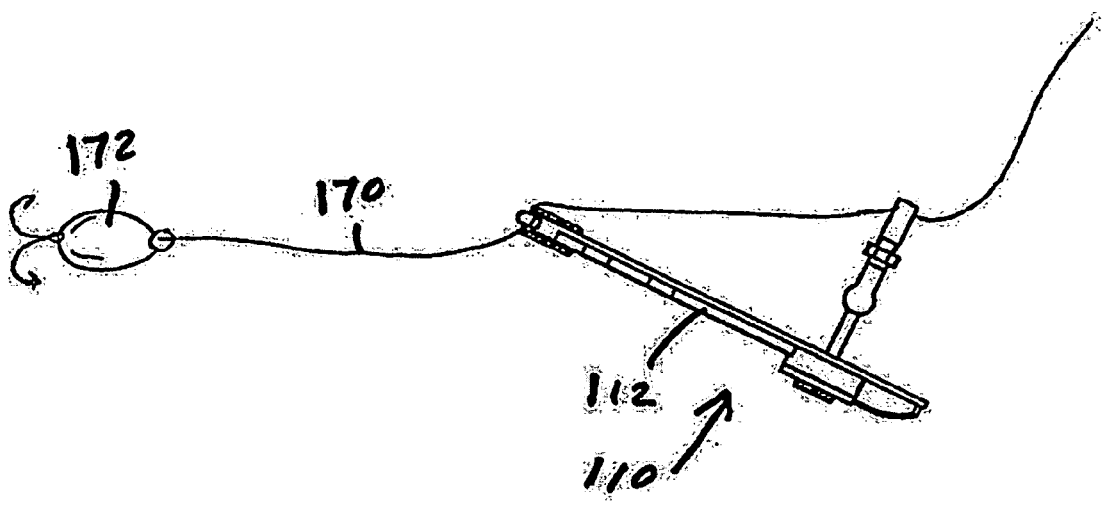
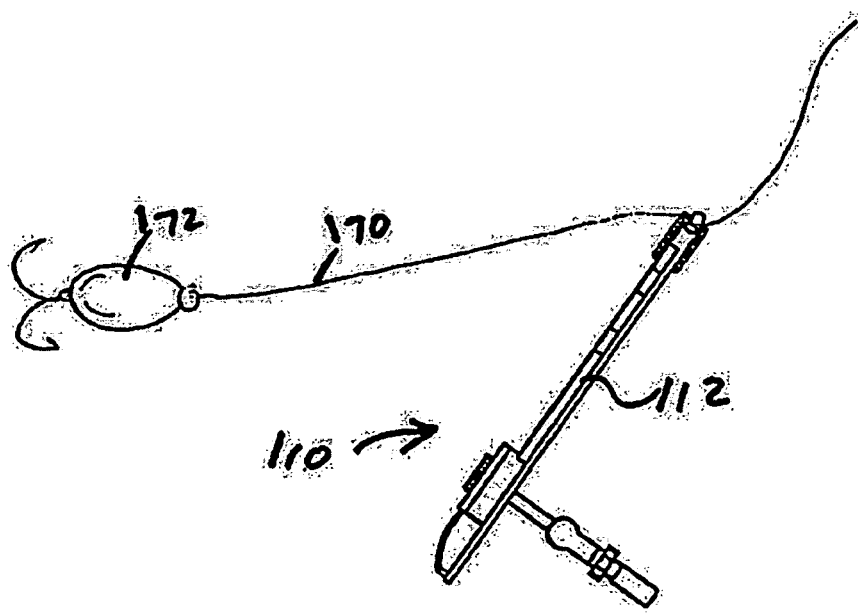
Fig. 15

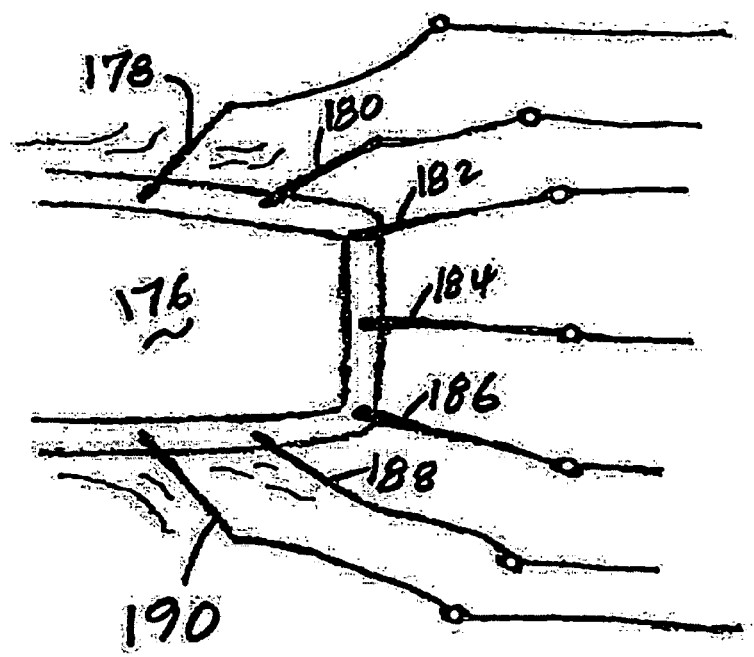
Fig. 19
Fig. 20
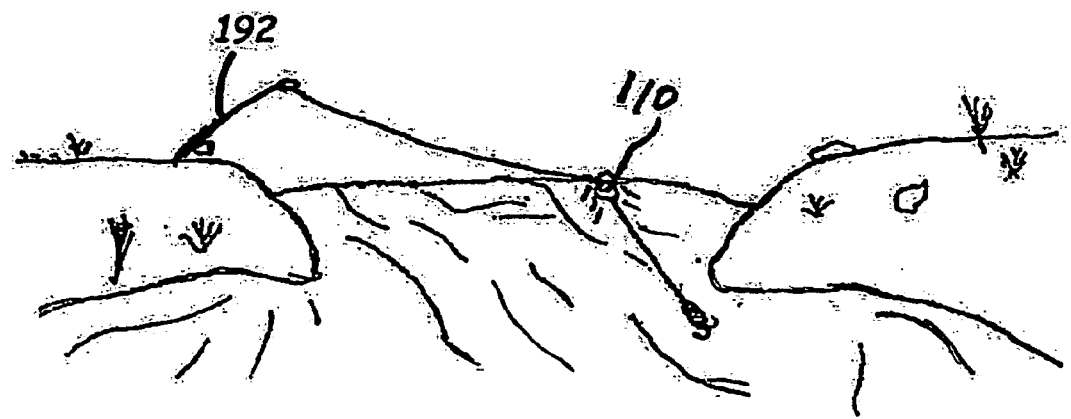

FISHING LINE RELEASE SYSTEM

CROSS REFERENCE TO RELATED APPLICATIONS

This application is a continuation-in-part of U.S. Ser. No. 10/790,998 filed Mar. 2, 2004, now abandoned, which is a continuation-in-part of U.S. Ser. No. 10/439,380 filed May 19, 2003, now abandoned.

The present invention relates to a fishing line release system. More particularly, the present invention relates to a system that includes a fishing line quick release mechanism that may be used in conjunction with a planar device for trolling or may alternatively be used with a down rigger cable and weight when used in down rigger fishing. When used in conjunction with the planar device, the system may be used for directional trolling. The planar device comprises a planar body, the fishing line quick release mechanism attached to the planar body, and a line locking assembly for securing a portion of a fishing line to the planar body. When used in conjunction with a down rigger cable and weight, the quick release mechanism may be used either on the down rigger cable or may be attached to the down rigger weight.

DESCRIPTION OF THE PRIOR ART

In the sport of fishing there are many approaches to movement of the fishing line and its accompanying lure and bait used to attract fish. Movement of the line is typically accomplished by pulling the lure and bait combination through the water either by moving the fishing shaft and reel while essentially standing still or by the pulling of the lure and bait by movement of a trolling fishing boat. In either approach, it is important that the lure and bait be positioned at a selected depth in an effort to hook fish in that area. This is not always an easy task given the varieties of lures and baits and their different weights. For example, when trolling at a relatively high speed in a boat, there is a tendency for the lure and bait to remain close to the surface rather than dropping to a desired depth.

In order to overcome this inherent restriction to the simple lure and bait combination, the use of a trolling device in the form of a planar board has generally been adopted by some in trolling. Examples may be found in U.S. Pat. Nos. 3,940,872, 5,339,561, 5,867,932, 5,867,933 and 6,016,622, set forth hereafter.

With respect to U.S. Pat. No. 3,940,872, issued on Mar. 2, 1976, to Weber for FISHING DEVICE, a flat, semi-disk-shaped plate with a connection for fishing bait and a fishing line is disclosed. An upstanding fin extends from one side of the plate.

With respect to U.S. Pat. No. 5,339,561, issued on Aug. 23, 1994, to Weber for DIRECTIONAL DIVING DEVICE FOR TROLLING, a diving sinker having a planing member with a fin formed on the top surface of the planing member is disclosed. On the underside of the planing member is a chamber which increases the volume and buoyancy of the diver.

With respect to U.S. Pat. No. 5,867,932, issued on Feb. 9, 1999, to Reiger for TROLLING OUTRIGGER, a trolling device for trolling a fishing lure from a moving boat is disclosed. The device includes a sealed floating hull with a counter-steering rudder, multiple line release clasps, and a variable depth measuring device.

With respect to U.S. Pat. No. 5,867,933, also issued Feb. 9, 1999, to Walker for PLANAR BOARD WITH STRIKE INDICATOR, a relatively complex planar board with strike indicator is disclosed. The planar board includes a base, a light source, a tip-up assembly, an actuation assembly, and a switch. When the lure is struck by a fish, the actuating fishing line release pivots away from the front fishing line release, whereby the pole is released to display a flag, and the light is activated.

With respect to U.S. Pat. No. 6,016,622, issued Jan. 25, 2000, to Even for FISHING DIVER WITH SLIDE THROUGH LINE AND PROTECTIVE FLEXIBLE SLEEVE THEREFOR, a fishing diver is provided by a diving planer. The planer includes a latch member for clamping the diving plane to the fishing line. When used in trolling, the diver dives downwardly and, when struck by a fish, the diving plane is unclamped.

While representing certain improvements in the state of the art for trolling, modifications and improvements can yet be made in the design of trolling devices.

SUMMARY OF THE INVENTION

The present invention overcomes the limitations of the prior art by providing a quick release mechanism for attachment to a planar device for directional trolling or for use with a down rigger assembly. The quick release mechanism is used for retaining a fishing line having a fishing hook at one end. When a fish strikes the fishing hook and jerks the line in an effort to get free, the quick release mechanism responds to the jerking motion by releasing the portion of the line it holds, thus more securely hooking the fish.

The quick release mechanism is provided in two preferred embodiments. The first embodiment is a butterfly style release which, in its fishing line-holding position, captures and holds a portion of the line between a pair of hinged release plates which are pivotally engaged to a release mechanism body and which, when in the holding position, are retained within a pocket defined in the mechanism body. When a fish is hooked on the fishing hook, its efforts to release itself result in the line being pulled and the butterfly release being pulled from its housing. Once released from its housing, the butterfly release is opened along its hinge and the line is released.

In an alternate embodiment of the quick release mechanism is a quick-release clip which holds the line between a pair of spring-loaded clips. When a fish strikes the hook attached to the fishing line, the line is pulled from between the clips.

Either quick release mechanism may be fitted to a planar diving device for trolling or may be fitted to either a down rigger line or to the weight attached to a down rigger line.

The planar device comprises a planar, disk-shaped body and the quick release assembly for the quick release of a fishing line being attached to the disk-shaped body. A fishing line locking assembly is also fitted to the disk-shaped body for securing a portion of the fishing line to the planar, disk-shaped body.

As an alternative, the quick release mechanism may be attached to a down rigger line or may be attached to a down rigger line weight.

Regardless of the arrangement, when a fish strikes the bait on the fishing hook, the force of the fish movement effects a release of the line from the quick release mechanism. In the case of the planar device, the planar body is held to the line by the retaining mechanism for retrieval with the fish.

A counterweight, a float, and a light may be fitted to the planar body.

It is the general object of the present invention to provide a quick release mechanism that can be used with either a planar diving device or with a down rigger assembly.

It is an additional object of the present invention to provide a quick release mechanism that, in its preferred embodiment, comprises a butterfly release portion that is hingedly attached to an housing.

It is a further object of the present invention to provide a quick release mechanism that incorporates a pair of spring-loaded clips.

It is yet an additional object of the present invention to provide such a system that is inexpensive to manufacture.

Still an additional object of the present invention is to provide such a device where the need for tying knots in the fishing line is eliminated.

A further object of the present invention is to provide such a device which can be used with a planar diving device from a boat or from any environment with a tide or a current, including off of docks and off-shore.

An additional object of the present invention is to provide such a device which can be used in conjunction with a down rigger.

Further scope of the applicability of the present invention will become apparent from the following detailed description, claims and drawings. However, it should be understood that the detailed description and specific examples, while indicating preferred embodiments of the invention, are given for illustrative purposes only, since various changes and modifications within the spirit and scope of the invention will become apparent to those skilled in the art.

BRIEF DESCRIPTION OF THE DRAWINGS

The present invention will become more fully understood from the detailed description given below, the appended claims, and the accompanying drawings in which:

FIG. 14 is a side view of the fishing device of FIG. 11 with the fishing line attached to the body by the line locking assembly and the quick release assembly;

FIG. 15 is a side view of the fishing device similar to that of FIG. 14, but showing the fishing line released from the quick release assembly;

FIG. 19 is a partial top view of the end of a boat illustrating a series of fishing shafts with trolling lines and fishing devices of the present invention connected thereto; and FIG. 20 is an elevational environmental view illustrating the device used off-shore in conjunction with sports fishing.

DETAILED DESCRIPTION OF THE PREFERRED EMBODIMENTS

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Figure 3:
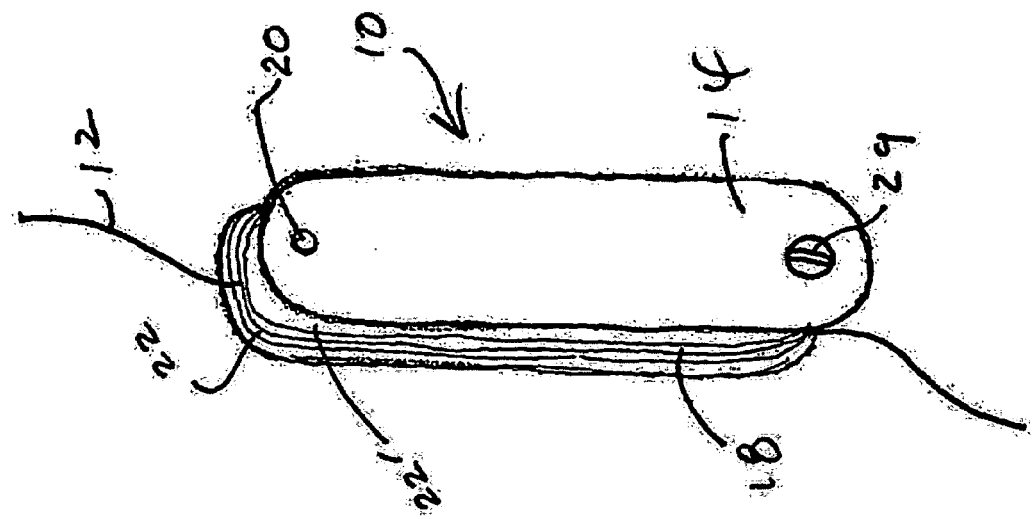
FIG. 3 is a perspective view of the first preferred embodiment of the quick release mechanism of the present invention shown in FIG. 1 and FIG. 2.
Figure 2:
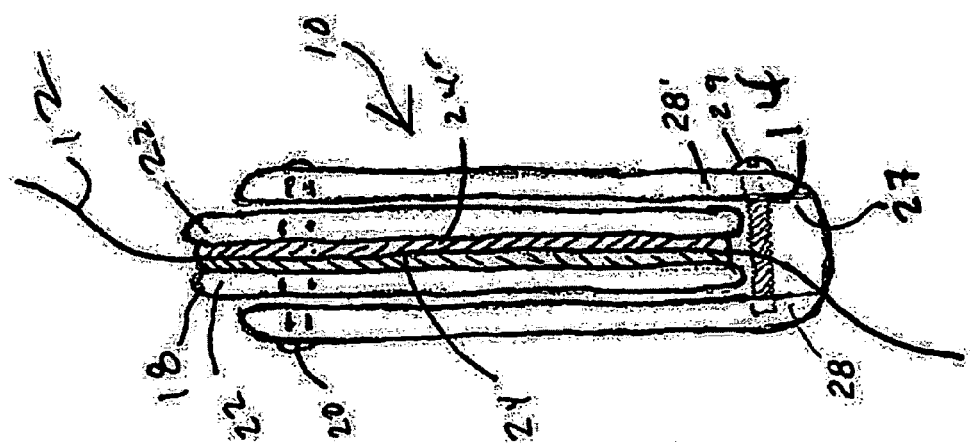
FIG. 2 is a back view of the first preferred embodiment of the quick release mechanism of the present invention shown in FIG. 1.
Figure 1:
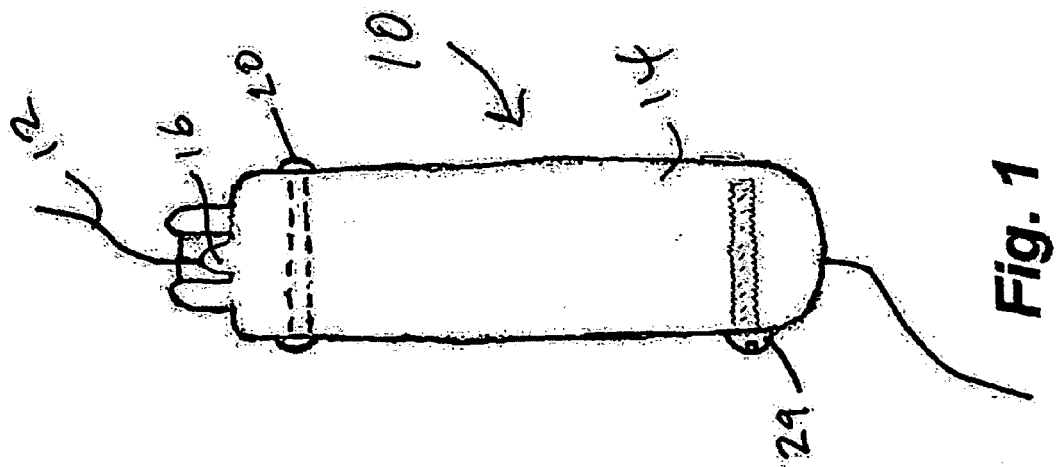
FIG. 1 is a front view of the first preferred embodiment of the quick release mechanism of the present invention showing the butterfly release stowed in the housing and illustrating a fishing line captured by the mechanism.

With respect to FIGS. 1 through 5, the first preferred embodiment of the quick release mechanism of the present invention, generally illustrated as 10, is shown. FIGS. 1 through 3 illustrate the release 10 in its closed position with a fishing line 12 captured therein.

FIG. 1 illustrates the release 10 as viewed from the back. The release 10 includes a housing 14. The housing 14 may be made from a variety of materials, including a polymerized material such as a plastic. The housing 14 includes a v-shaped butterfly separator 16 formed at its top.

Referring to FIG. 2, a front view of the release 10 is illustrated. A butterfly release assembly 18 is pivotably attached to the housing 14 by a pin 20. The butterfly release assembly 18 includes a pair of opposing plates 22, 22'. Each of the plates 22, 22' is lined with a material 24, 24' capable of gripping the fishing line 12. The material 24, 24' may be a rubber material or may be a soft plastic.

FIG. 3 is a perspective view illustrating the release 10 in its closed position with the fishing line 12 captured between the plates 22, 22' of the butterfly release assembly 18. This is the arrangement that would be used when the fisherman first uses the assembly before it is inserted into the water.

Figure 5:
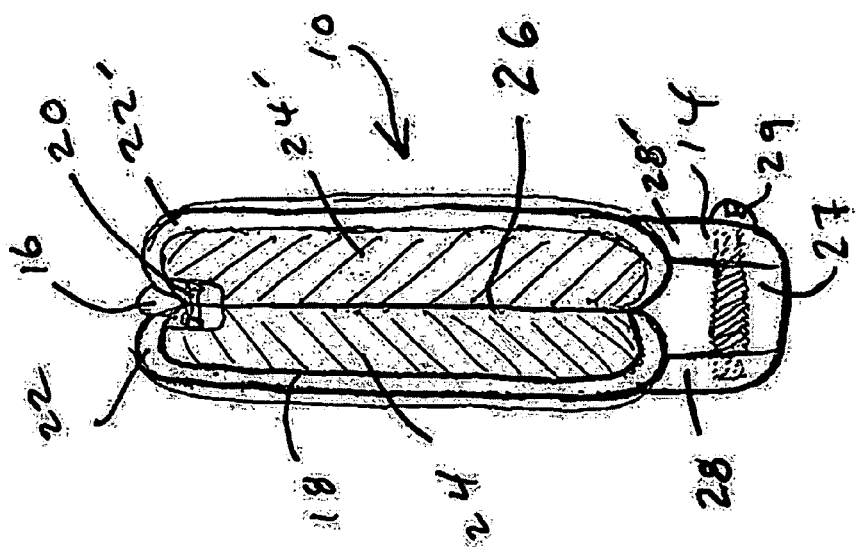
FIG. 5 is a back view of the first preferred embodiment of the quick release mechanism of the present invention showing the butterfly release in its open and unhoused position.
Figure 4:
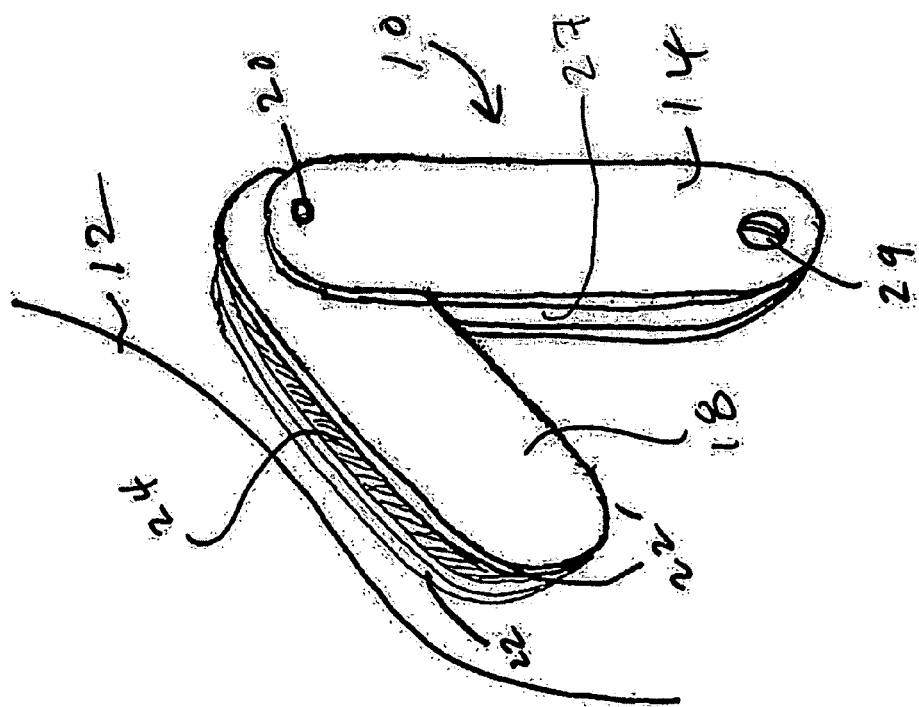
FIG. 4 is also a perspective view of the first preferred embodiment of the quick release mechanism of the present invention similar to the view of FIG. 3 but showing the butterfly release in its open and unhoused position.

FIGS. 4 and 5 illustrate the release 10 in its open position after a fish has struck the line 12. In the event of a fish strike, the fish (not shown) pulls on the fishing line 12, causing the butterfly assembly 18 to pivotably move out of the housing 14. Insofar as the butterfly assembly 18 is pivotably attached to the housing 14 by the pin 20, the butterfly assembly 18 is allowed to pivot out and away from the housing 14. The separator 16 causes the plates 22, 22' to become separated from one another along a hinge 26 (shown in FIG. 5) as the butterfly assembly 18 is pulled away from the housing 14.

Once separated as shown in FIGS. 4 and 5, the line 12 is released from its captured position.

A system for adjusting the tension applied on the butterfly assembly 18 may be incorporated into the release 10. This system is shown in FIGS. 1 through 10, although it is to be understood that it may be incorporated into other arrangements of the present invention, particularly with regard to the arrangements disclosed in FIGS. 9 and 10 in conjunction with the down rigger.

The housing 14 includes a pocket 27 defined by a pair of opposing walls 28, 28'. The butterfly assembly 18 fits substantially within the pocket 27 when in its fishing line engaging position as illustrated in FIGS. 1 through 3. It may be desired to adjust the tension applied on the butterfly assembly 18 so as to allow the operator to target fish of different sizes. Specifically, by adjusting the width between the walls 28, 28', the ability of the butterfly assembly 18 to be fully inserted into the pocket 27 is consequently adjusted. A tensioner 29 is provided for this purpose. (A threaded screw is illustrated but it should be understood that other tensioning mechanisms may be used without deviating from the invention as portrayed.) By adjusting the width between the walls 28, 28' the ease of release of the butterfly assembly 18 from the pocket 27 may be adjusted. By way of example, if the tensioner 29 is adjusted (by threading, in this case) so that the width between the walls 28, 28' is narrowed, release of the butterfly assembly 18 from the pocket 27 will be more difficult, this situation being more appropriate if the operator is seeking larger fish. Conversely, if the tensioner 29 is adjusted so that the width between the walls 28, 28' is wider, then less tension will be applied to the butterfly assembly 18 and it may be withdrawn more readily. This latter instance would be appropriate for an operator seeking smaller fish.

The quick release mechanism 10 may be used in conjunction with a planar diving device as described above. The components of the fishing device illustrated in FIGS. 6 through 8 may be made of a variety of materials, including rubber, molded plastic components, brass/brass-plated and stainless steel elements. For example, the body of the device may be made from a molded polycarbonate. The only prerequisite for the selection of material is that the material chosen be resistant to degradation which may be caused by either salt or fresh water.

Figure 6:
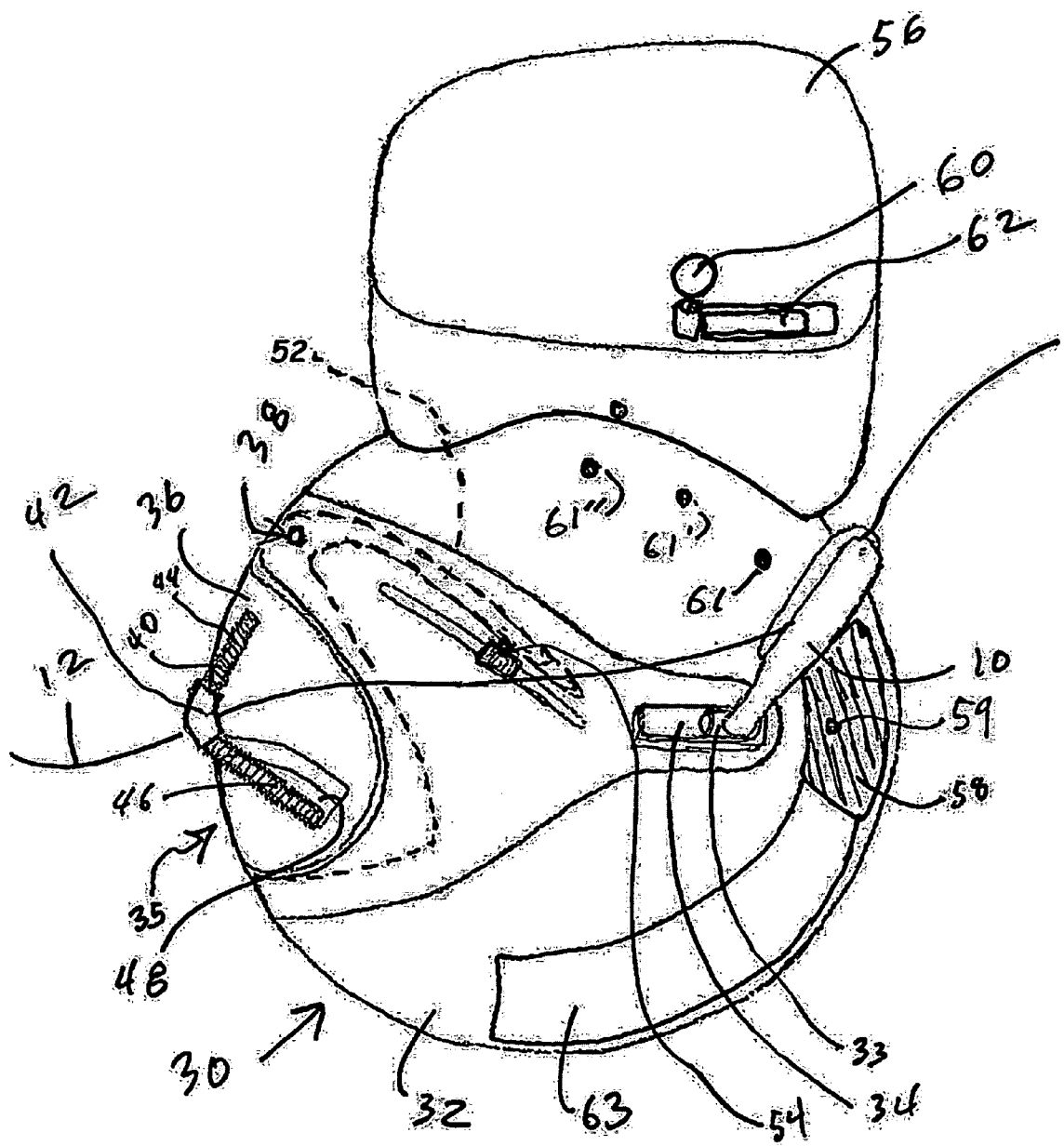
FIG. 6 is a top plan view of the first preferred embodiment of the planar diving device of the present invention showing the first preferred embodiment of the quick release mechanism in place.

FIG. 6 is a top plan view of a planar diving device, generally illustrated as 30. The planar diving device 30 includes a planar, disk-shaped body 32. The quick release mechanism 10 is shown attached to the body 32. The quick release mechanism 10 may be attached in a variety of means, including by direct attachment using a conventional fastener, by spring attachment or by other means as will be described further below. As illustrated in FIG. 6, and by way of example, the quick release mechanism 10 may be attached to the body 32 by use of a drum-shaped member 33 that is slidably disposed within an elongated slot 34 formed within the body 32. The operator can thus selectively adjust the position of the quick release mechanism 10 by movement and selective positioning of the drum-shaped member 33 within the slot 34.

The planar diving device 30 additionally includes a line locking mechanism, generally illustrated as 35, for lockably holding the fishing line 12 to the device 30 once a fish has struck the fishing hook and the line 12 has been released from the mechanism 10. The locking mechanism 35 includes a pivoting member 36 that is pivotably attached to the body 32 by a pivot pin 38. A line lock 40 formed from a spring and having a rubber gripping portion 42 is releasably fitted to the pivoting member 36. One end 44 of the lock 40 is permanently fitted into an aperture defined in the pivoting member 36. Another end 46 is releasably inserted into a slot 48 formed in the top side of the pivoting member 36.

When the operator is preparing to use the planar diving device 30, the fishing line 12 is inserted between the plates 22, 22' of the butterfly release 18 according to the description provided above in conjunction with FIGS. 1 through 5. The operator then pivotably inserts the butterfly release 18 into the housing 14, thus causing the plates 22, 22' to move toward one another and to grippingly engage the line 12 therebetween. The operator also releases the end 46 of the lock 40 from the slot 48. Given the spring construction of the lock 40 it tends to straighten out once released. The operator then inserts a portion of the fishing line 12 between the gripping portion 42 of the lock 40 and the pivoting member 36 and re-inserts the end 46 into the slot 48, thus locking the fishing line 12 therein.

The pivoting member 36 includes a pivoting element 50 which is pivotably positioned substantially within the body 32, shown mostly in broken lines. The pivoting member 36 includes a tensioning arm 52, also shown in broken lines. A sliding tensioner 54 is provided to allow the user to adjust the amount of tension applied to the tensioning arm 52, thus being able to vary the amount of force necessary to cause the pivoting member 36 to be withdrawn from the body 32.

The planar diving device 30 may be fitted with accessories including a float 56 and/or a weight 58. The float 56 is composed of a known material used for achieving buoyancy. The float 56 may be fitted with a light 60 for night diving. The light 60 may be of either the incandescent or LED variety. A power supply 62 is used to power the light 60.

While a single weight 58 is shown it should be understood that more than one weight 58 may be used at a time. Regardless of the number of weights used, they are selectively removable thus providing the operator with a high degree of flexibility such that heavier, lighter, or no weights at all may be used. While removability of the weight 58 may be accomplished in a known manner, two possible approaches are illustrated. In the first, the weight 58 may be fastened to the body 32 by way of a mechanical fastener such as a screw 59. A series of optional fastening holes 61, 61', 61" may also be selectively formed in the body 32 for alternative placements of the weight 58. Of course, additional weights (not shown) may be fitted to the fastening holes 61, 61', 61". As an alternative to the mechanical attachment method of fastening the weight 58 to the body 32, a rack or slide 63 may be formed on the body 32. In such event the weight 58 would include a protrusion that would allow its attachment to the rack or slide 63 in a known manner. In the event that the rack or slide 63 embodiment is selected the screw 59 can act as a set screw to limit movement of the weight 58 along the rack or slide 63.

Figure 7:
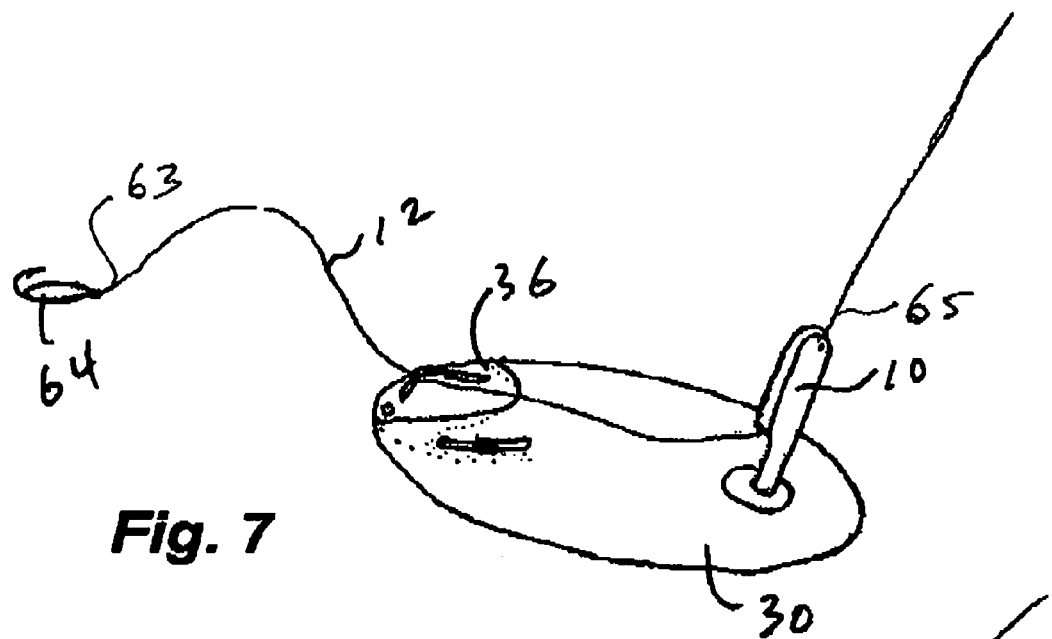
FIG. 7 is a perspective view of the planar device illustrated in FIG. 6 in conjunction with a fishing line.
Figure 8:
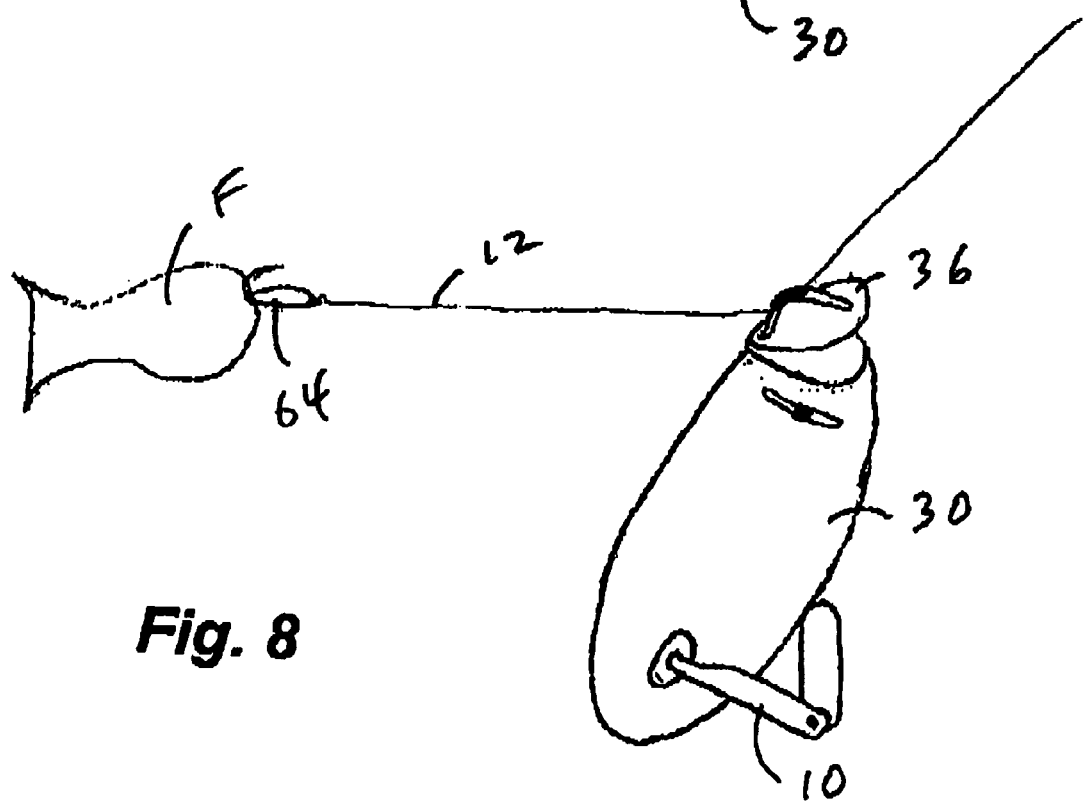
FIG. 8 is a perspective view of the planar device illustrated in FIG. 6 and FIG. 7 but showing a fish caught on the hook and the line released from the quick release mechanism.

FIGS. 7 and 8 illustrate the planar diving device 30 in use. As shown in FIG. 7, the device 30 has the fishing line 12 attached thereto as described above. The fishing line 12 includes a hook end 63 to which a fishing hook 64 is attached as is conventionally known. The fishing line 12 also includes an intermediate portion 65 which is grasped by the quick release mechanism 10. In FIG. 8, a fish (F) has struck the hook 64, effecting release of the line 12 from the quick release mechanism 10. In addition, the pivoting member 36 has been caused to swing away from the body 32, also as described above.

In addition to using the quick release mechanism 10 in conjunction with a planar diving device, the quick release mechanism can also effectively be used in down rigger fishing. This is illustrated in FIGS. 9 and 10.

Figure 9:
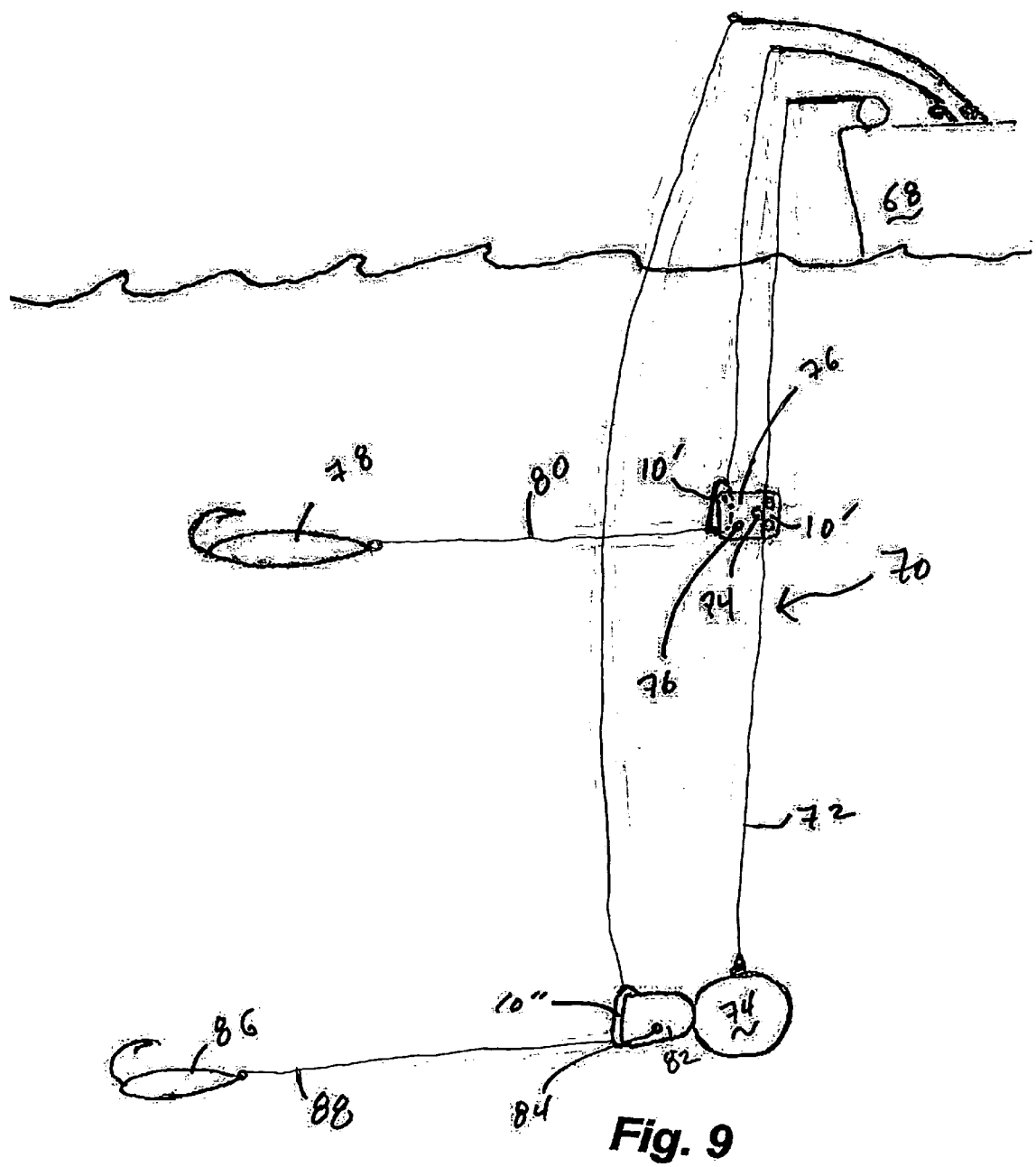
FIG. 9 is a view showing the preferred quick release mechanism in use in conjunction with a down rigger device.

With respect first to FIG. 9, a boat 68 is shown in relation to a down rigger assembly, generally illustrated as 70. The assembly 70 includes a down rigger cable 72 and a weight ("cannon ball") 74. Two arrangements of the quick release mechanism are shown. The first, a quick release mechanism 10', is shown attached to the approximate mid portion of the down rigger cable 72. A plurality of wheels 74 are fitted to an attachment body 76. The wheels 74 are rollingly attached to the down rigger cable 72. The wheels 74 allow the body 76 to be adjusted up or down along the cable 72 as is preferred for a given depth of fishing. A tensioner 76 is provided to allow the user to adjust the amount of tension to be applied to the quick release mechanism 10', thus allowing the user to adjust the tension needed for a given type of fish being sought.

Figure 10:
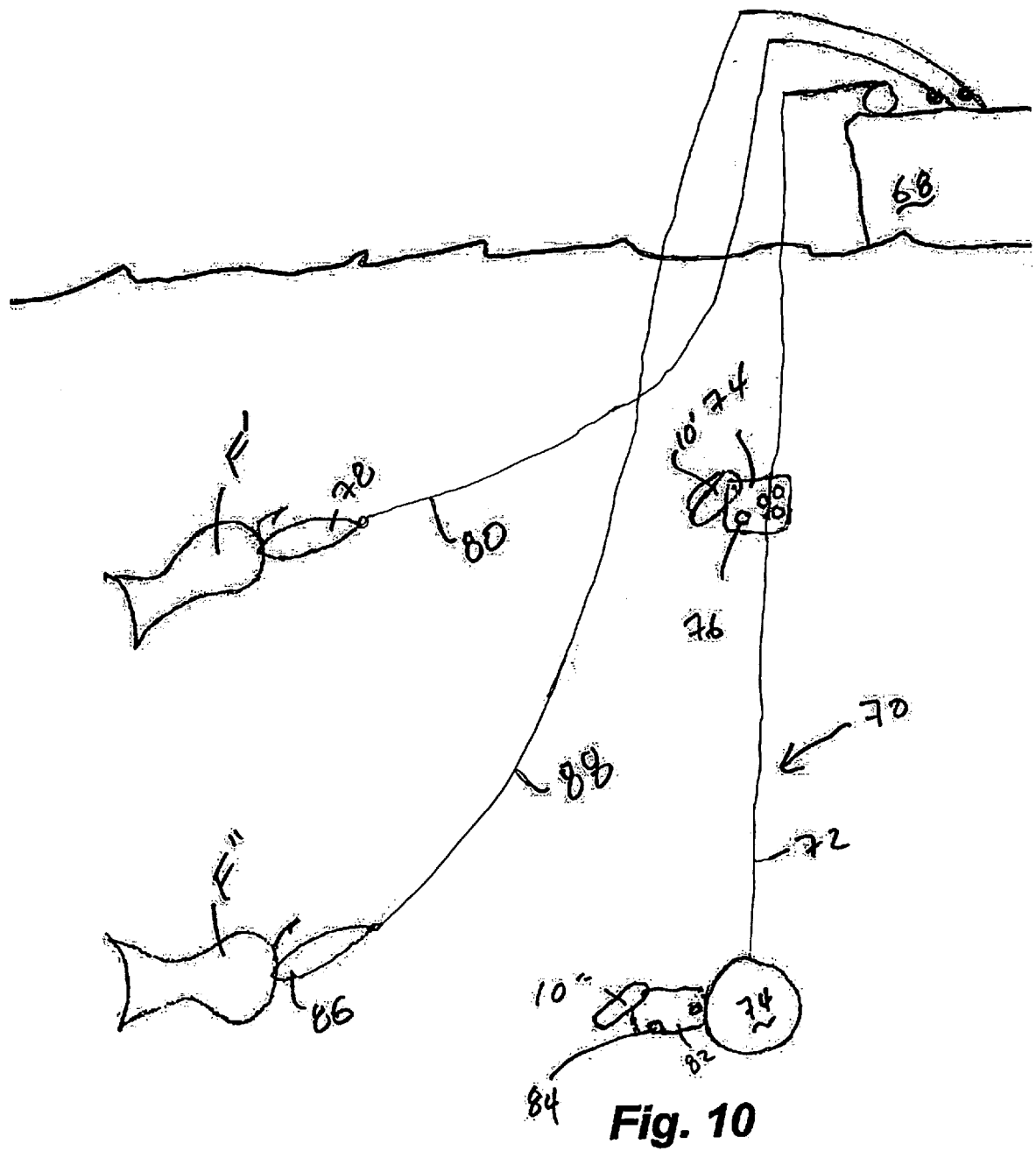
FIG. 10 is a view similar to that of FIG. 9 but showing the quick release mechanisms having been released.

In FIG. 10 a fish (F') has taken a hook 78 attached to a line 80. The action of the fish F' has caused the line 80 to be released from the quick release mechanism 10' as discussed above. The attachment body 76 remains fixed to the down rigger cable 72 for retrieval by the user.

As an alternative to using the quick release mechanism in conjunction with the cable 72, a quick release mechanism 10" may be attached to the weight 74 by a connector body 82 as is shown in FIG. 9. The body 82 is attached to the weight 74 by mechanical fastening using screws and the like (not shown). A tensioner 84 may be incorporated into the body to allow tension on the quick release mechanism 10" to be adjusted as above. In FIG. 10 a fish (F") has taken a hook 86 attached to a line 88. The action of the fish F" has caused the line 88 to be released from the quick release mechanism 10" as discussed above. The connector body 76 remains fixed to the weight 74 for reuse by the user.

FIGS. 11 through 18 illustrate alternate embodiments of both the planar diving device of the present invention as well as the quick release of the present invention.

Figure 11:
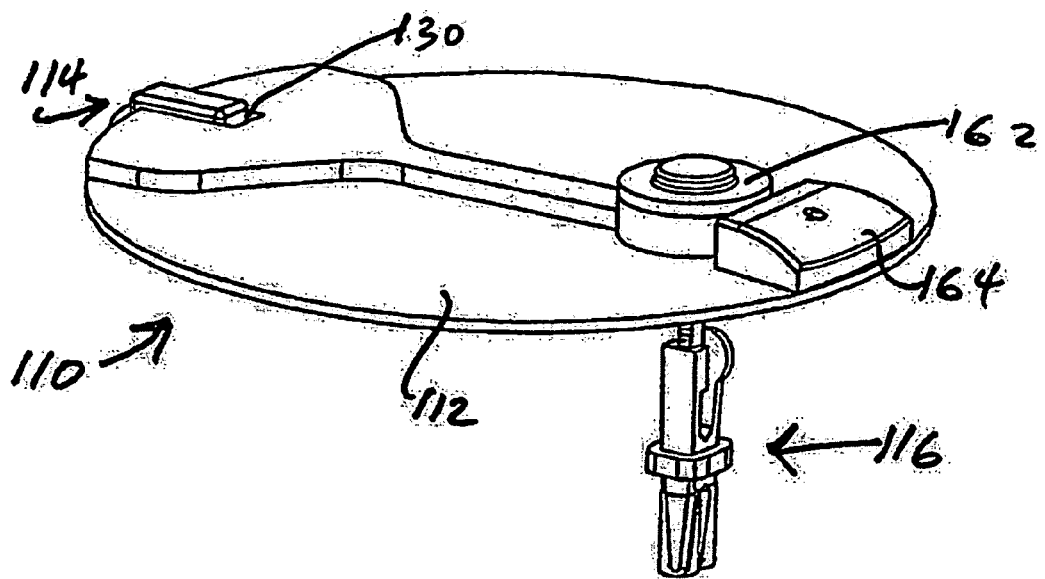
FIG. 11 is a perspective, generally bottom view of the alternative preferred embodiment of the planar device for directional trolling of the present invention.
Figure 12:
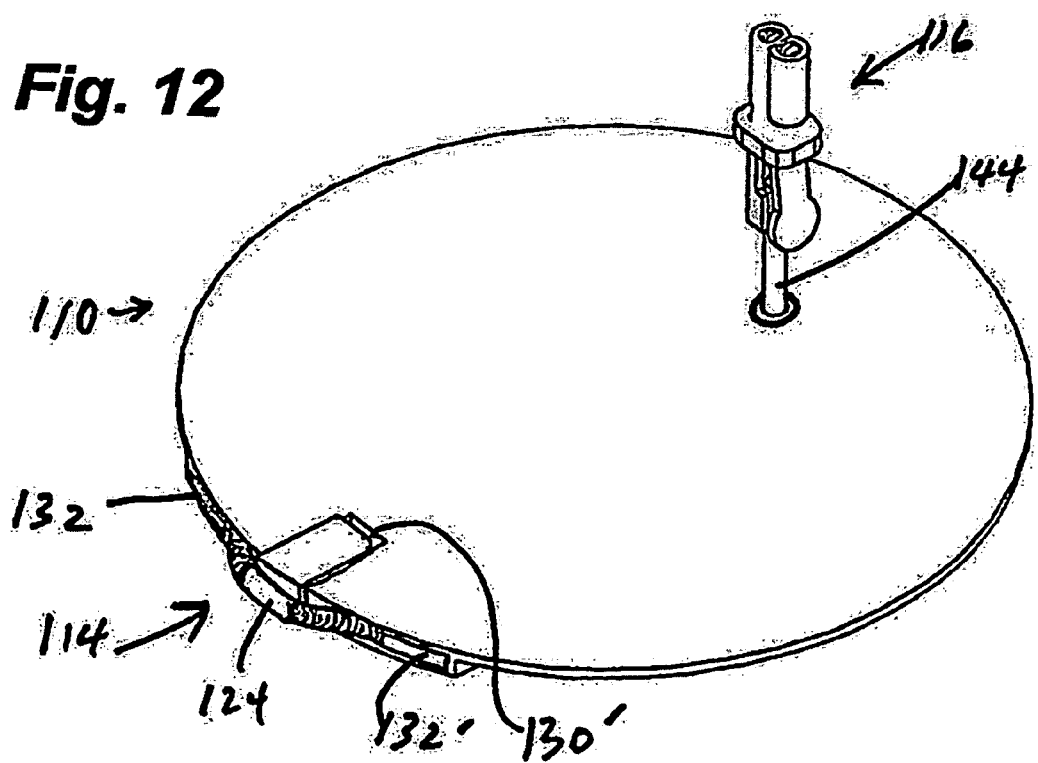
FIG. 12 is a perspective, generally top view of the device of FIG. 11.
Figure 13:
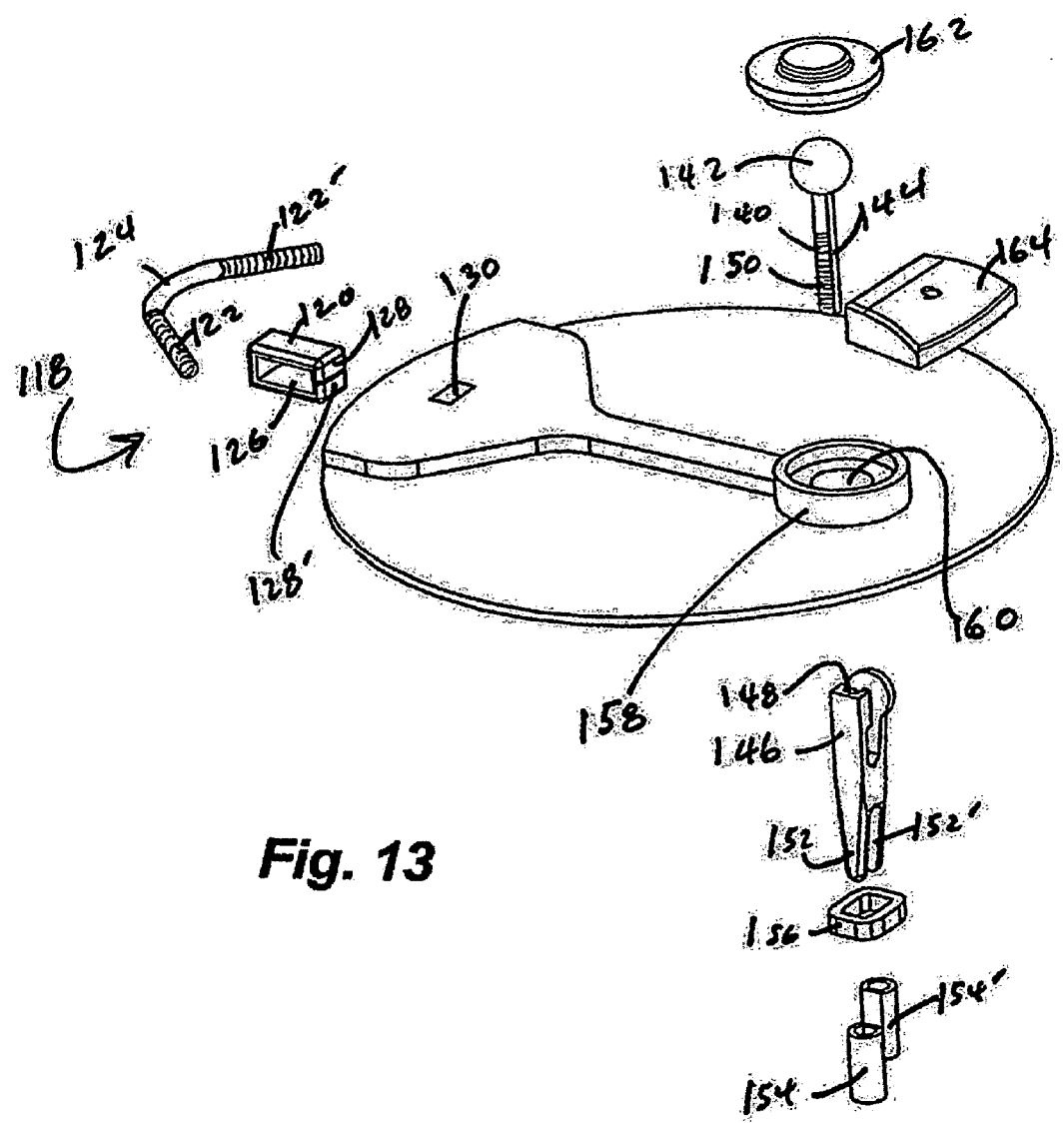
FIG. 13 is a view similar to that of FIG. 11 but illustrating the fishing device in an exploded configuration.

With reference to FIGS. 11, 12 and 13, various views of a fishing device according to the present invention, illustrated as 110, are shown. The components of the fishing device may be made of a variety of materials, including rubber, molded plastic components, brass/brass-plated and stainless steel elements. For example, the body of the device may be made from a molded polycarbonate. The only prerequisite for the selection of material is that the material chosen be resistant to degradation which may be caused by either salt or fresh water.

The device 110 includes a planar, disk-shaped body 112, a fishing line locking assembly, generally illustrated as 114, and a fishing line quick release assembly generally illustrated as 116. It is to be understood that while the preferred shape of the present invention is in the form of a disk, other shapes may be possible, such as an oval.

Figure 16:
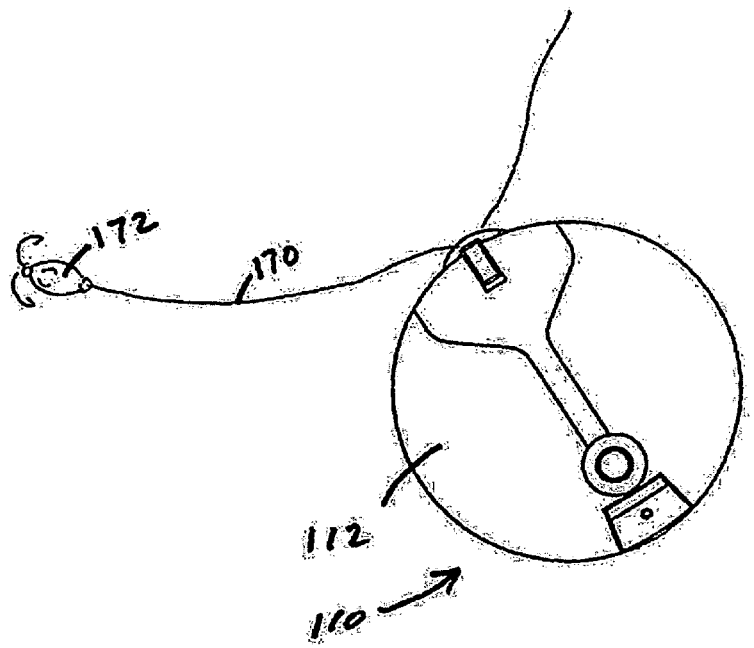
FIG. 16 is a top plan view of the fishing device of FIG. 11 showing the fishing line still captured by the line locking assembly but released from the quick release assembly.

The fishing line locking assembly 114 includes a fishing line spring 118 and a guide 120. The fishing line spring 118 includes a pair of spaced-apart spring elements 122, 122' that are connected to one another by a line insulator 124. A line guide 126 having a pair of opposed flanges 128, 128' is releasably attached to the body 112 by attaching to a pair of slots 130 (formed on the top side of the body 112), 130' (formed on the bottom side of the body 112). The spaced apart spring elements 122, 122' are frictionally engaged with a pair of slots 132, 132' formed in the end wall of the body 112, as illustrated in FIG. 12. A portion of the fishing line is captured between the insulator 124 and the line guide 126 which are formed from a rubber or a plastic material to protect the line from damage. The capture of the line between the insulator 124 and the line guide 126 is shown in FIGS. 14 through 16.

Still referring to FIGS. 11 through 13, the quick release assembly 116 comprises a quick release arm 140 which includes a ball 142 and a shaft 144. The ball 142 may be attached to the shaft 144 in a known manner such as by threading or may be integrally molded therewith. The quick release arm 140 further includes a quick release clip 146 that is attached to the shaft 144. The quick release clip 146 preferably includes a locking flange 148. As a preferred option, the shaft 144 may have formed on one side thereon a plurality of parallel ridges 150 which provide selective stops for the locking flange 148 of the clip 146, thereby allowing linear adjustment of the quick release clip 146 thereupon.

The quick release clip 146 further includes a pair of opposed jaws 152, 152' on which are provided rubber or plastic grips 154, 154'. A resilient band 156 is placed over the opposed jaws 152, 152' to act as a biasing element by which the jaws 152, 152' are urged to their closed positions. A portion of the fishing line is placed between the grip-covered jaws 152, 152' as will be discussed below.

The ball 142 is releasably disposed with a ball receiver 158 formed in the top side of the body 112. An aperture 160 is formed at the base of the ball receiver 158 thus forming a continuous opening from one side to the other. With the ball 142 in place in the ball receiver 158, the shaft 144 of the quick release arm 40 extends through the aperture 160. The ball 142 is held in place within the ball receiver 158 by a cap 162 which is held in place to the ball receiver 158 by threading or by conventional fasteners such as screws (not shown).

A weight 164 may optionally be fitted to the body 112 by fastening with conventional fasteners in a known manner. The weight 164 may be interchangeable with other weights of different amounts so as to help pull the device 110 downward to achieve a desired depth.

In operation, and generally referring to FIGS. 14 and 16, the user first draws a fishing line 170 (with a lure 172 attached at one end) between the insulator 124 and the line guide 126 of the fishing line lock assembly 114 until a desired point is reached. Then the spring elements 122, 122' are frictionally engaged with the slots 132, 132' of the body 112 so that the fishing line is captured between the insulator 124 and the line guide 126. The operator then squeezes the quick release clip 146 to open the grip covered jaws 152, 152' and threads a portion of the fishing line therebetween, thereafter releasing the clip 146 such that the selected portion of the fishing line is captured between the jaws 152, 152'.

Once placed in the water, and as illustrated in FIG. 14, the weight 164 tends to pull the one end of the body 112 downward, thus allowing the device 110 to dive to a selected depth when pulled or when a current is present. Once the bait is struck by a fish, the force of the striking causes a portion of the line 170 to be released from the grasp of the jaws 152, 152' and the planing and diving motions are stopped. The device 110, however, remains securely attached to the line 170 by the line locking assembly 114, thus preventing its being lost. The device 110 is thus retrieved along with the line 170, the bait 172 and the fish (not illustrated).

Figure 17:
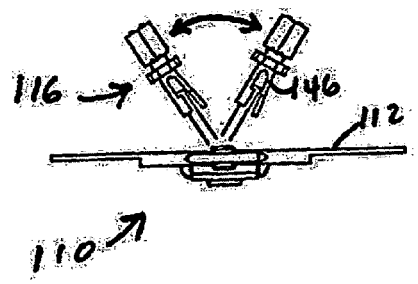
FIG. 17 is an end view of the device of FIG. 11 illustrating the pivoting action of the quick release arm of the quick release assembly.
Figure 18:
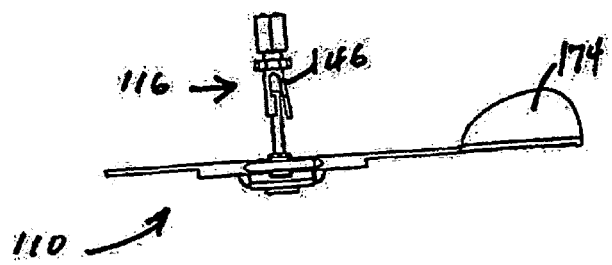
FIG. 18 is an end view of a further embodiment of the alternative preferred embodiment of the present invention illustrating the addition of an optional floatation device to the body of the device.

The fishing device 110 allows a great deal of flexibility in use and in operation. Much of this versatility is the result of the pivoting movement of the arm 140 of the quick release assembly 116. Because of the presence of the ball 142 mounted within the ball receiver 158, the arm 140 is allowed to pivot, as illustrated in FIG. 17. According to this arrangement, a broad range of planing and diving maneuvers can be achieved through the manipulation of the fishing rod and reel.

As an alternative to diving, however, it may be desired for the fishing device 110 to be used for fishing on or near the surface. Accordingly, and with reference to FIG. 18, a float 174 may be releasably attached to the body 112 by frictional engagement or by fasteners in known manners.

The fishing device 110 of the present invention may be used from a boat and may be used, as shown in FIG. 19, in conjunction with a plurality of similar devices from the same boat, illustrated generally as 176. As shown, a number of fishing rod and reel assemblies 178 through 190, each having a fishing device of the present invention (not visible) attached to a respective line are disposed at the stern of the boat 176 for trolling. As an alternative, the fishing device 110 of the present invention may be used from an on-shore position as shown in FIG. 20 where a lone fishing rod and reel 192 is being used in conjunction with a fishing device 10 for surface planing.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A fishing line release system, the system comprising:
   a fishing line having a hook end and an intermediate portion, said hook end having a fishing hook attached thereto;
   a fishing line quick-release, said release including a housing having a pocket defined therein, said release further including a butterfly assembly for capturing and retaining said intermediate portion of said fishing line, said butterfly assembly being pivotably attached to said housing and movable between a fishing line capturing position in which said butterfly assembly is substantially positioned within said pocket of said housing and a fishing line releasing position in which said butterfly assembly is substantially positioned outside of said pocket of said housing, said butterfly assembly including a pair of generally elongated plates, each of said plates having a long axis, each of said plates further having a hinged side defined along said long axis, said butterfly assembly further including a hinge fixed to said hinged sides of said elongated plates to hinge said plates together, said housing further including a v-shaped butterfly plate separator which urges said plates to move away from one another when moved from said fishing line capturing position to said fishing line releasing position; and
   a quick-release support to which said quick-release is fixedly attached,
   whereby said intermediate portion of said fishing line is captured and held by said butterfly assembly when said butterfly assembly is in said fishing line capturing position and whereby said intermediate portion of said fishing line is released from said butterfly assembly when said butterfly assembly is in said fishing line releasing position.

2. The fishing line release system of claim 1, wherein each of said elongated plates includes an inner side, said inner side being lined with a fishing line gripping material.

3. The fishing line release system of claim 1, wherein said pocket of said housing is defined by a pair of spaced-apart walls and said housing further includes a tension adjusting system.

4. The fishing line release system of claim 3 wherein said tension adjusting system comprises a threaded element for adjusting the space between said spaced-apart walls of said housing.

5. A fishing line release system, the system comprising:
   a fishing line, said fishing line having a hook end and an intermediate portion;
   a fishing line quick-release, said release including a housing having a pocket defined therein, said release further including a butterfly assembly for capturing and retaining said intermediate portion of said fishing line, said butterfly assembly being pivotably attached to said housing and movable between a fishing line capturing position in which said butterfly assembly is substantially positioned within said pocket of said housing and a fishing line releasing position in which said butterfly assembly Is substantially positioned outside of said pocket of said housing, said butterfly assembly including a pair of generally elongated plates, each of said plates having a long axis, each of said plates further having a hinged side defined along said long axis, said butterfly assembly further including a hinge fixed to said hinged sides of said elongated plates to hinge said plates together, said housing further including a v-shaped butterfly plate separator which urges said plates to move away from one another when moved from said fishing line capturing position to said fishing line releasing position; and
   a fishing device said device including a body and a line locking mechanism for lockably holding said intermediate portion of said fishing line in conjunction with said quick-release, said line locking mechanism including a fishing line lock and a pivoting member, said fishing line lock being attached to said pivoting member, said pivoting member being pivotably attached to said body, whereby said line locking mechanism retains the fishing line regardless of whether said quick-release is in said fishing capturing position or in said fishing line releasing position,
   whereby said intermediate portion of said fishing line is captured and held by said butterfly assembly when said butterfly assembly is in said fishing line capturing position and whereby said intermediate portion of said fishing line is released from said butterfly assembly when said butterfly assembly is in said fishing line releasing position.

6. The fishing line release system of claim 5, wherein each of said elongated plates includes an inner side, said inner side being lined with a fishing line gripping material.

7. The fishing line release system of claim 5, wherein said pocket of said housing is defined by a pair of spaced-apart walls and said housing further includes a tension adjusting system.

8. The fishing line release system of claim 7 wherein said tension adjusting system comprises a threaded element for adjusting the space between said spaced-apart walls of said housing.

9. The fishing line release system of claim 7 wherein said tension adjusting system comprises an adjustable tensioner movable between a first direction to increase tension and a second direction to reduce tension.

* * * * *